(12) United States Patent
Gutsmann et al.

(10) Patent No.: US 6,266,096 B1
(45) Date of Patent: Jul. 24, 2001

(54) DIGITAL ENCODING METHOD AND APPARATUS FOR REPLACING PART OF THE DATA SIGNAL WITH SYNTHETICALLY GENERATED AMPLITUDE VALUES

(75) Inventors: Rolf-Dieter Gutsmann; Hartmut Hackmann; Jens Rennert, all of Hamburg (DE)

(73) Assignee: U.S. Philips Corporation, New York, NY (US)

( * ) Notice: Subject to any disclaimer, the term of this patent is extended or adjusted under 35 U.S.C. 154(b) by 0 days.

(21) Appl. No.: 09/088,723

(22) Filed: Jun. 1, 1998

(30) Foreign Application Priority Data

Jun. 7, 1997 (DE) ................................ 197 24 077

(51) Int. Cl.[7] ................................... H04N 7/08
(52) U.S. Cl. ........................ 348/476; 348/474; 348/470
(58) Field of Search ..................................... 348/476, 478, 348/572, 573, 553, 470, 473, 474, 467, 500, 501, 607

(56) References Cited

U.S. PATENT DOCUMENTS 4,122,487 * 10/1978 Beaulier et al. ....................... 358/13

* cited by examiner

Primary Examiner—Victor R. Kostak
(74) Attorney, Agent, or Firm—Russell Gross

(57) ABSTRACT

For a method of encoding digital data of arbitrary data rates of at least one data signal for jointly transmitting the encoded data with a digital picture signal, as well as a data encoder for such data, a flexible adaptation to different data formats is provided in which, in the encoding of data, at least parts of the edges of data bits of the data signal are replaced by synthetically generated amplitude values constitutes edges which are within the bandwidth limitations predetermined for the encoded data bits.

16 Claims, 1 Drawing Sheet

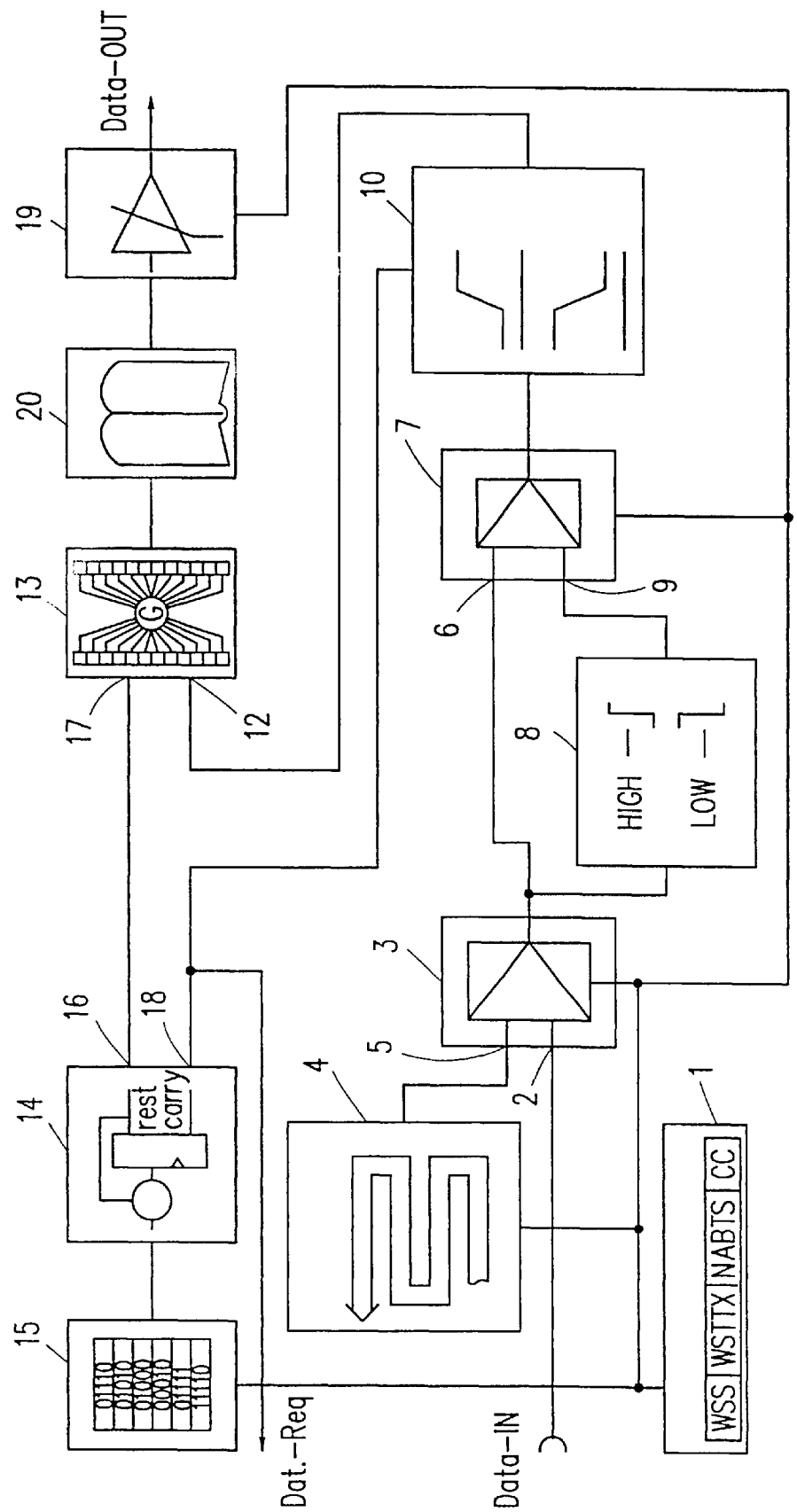

DIGITAL ENCODING METHOD AND APPARATUS FOR REPLACING PART OF THE DATA SIGNAL WITH SYNTHETICALLY GENERATED AMPLITUDE VALUES

BACKGROUND OF THE INVENTION

1. Field of the Invention

The invention relates to a method of encoding digital data of arbitrary data rates of at least one data signal for jointly transmitting the encoded data with a digital picture signal, and to a digital data encoder for encoding such data.

2. Description of the Related Art

Together with analog television signals, additional data are transmitted for different purposes. These data may be, for example, teletext data which are transmitted in given picture lines of the television signal. These days, for example, data bits for signalizing the format of the television signal (4:3 or 16:9) are additionally transmitted. Internationally, different data formats are transmitted at different data rates and different bandwidths in predetermined picture lines of the television signal.

There may be a desire to insert such data, which are not normally present in a picture signal, into such a signal so as to apply them, for example, to a digital encoder which converts the digital picture signal into an analog picture signal. For this purpose, the laws in the analog world relating to bandwidth limitation, signal shapes, clocks, etc., are to be adhered to after conversion of the data signal into an analog signal. However, these laws may be different for the different types of data.

Known data encoders provided for this purpose have with the problem that they are not switchable to different data rates and data formats. Consequently, individual data encoders must be provided for the different data formats. A multitude of data encoders must therefore be provided for data signals of different formats to be possibly inserted into a digital picture signal.

SUMMARY OF THE INVENTION

It is an object of the invention to provide a data encoding method and a data encoder which allow insertion of data of different formats, bandwidths and clock rates into a digital picture signal.

According to the invention, this object is achieved in a method of encoding digital data in that, in the encoding of the data, at least parts of the edges of data bits of the data signal are replaced by synthetically generated amplitude values constituting edges which are within bandwidth limitations predetermined for the encoded data bits.

Before inserting the data into the digital picture signal, their edges or the edges of the data bits are replaced by synthetically generated amplitude values. Thus, instead of the original edges of the data bits, amplitude values which form a new edge are used. The amplitude values forming the new edges are implemented in such a way that they are within predetermined clock rasters and bandwidth limitations.

Dependent on the data format, data rate, data clock and predetermined bandwidth limitations, the amplitude values may be implemented in such a way that they comply with these conditions.

In this way, different data with different conditions can be inserted into the digital picture signal. This provides an individual adaptation to the predetermined bandwidth limitations and to the data to be inserted.

In one embodiment of the method according to the invention, the edges of the data bits are replaced by amplitude values which constitute at least parts of a sine oscillation, and the edges built up from the amplitude values are inserted into a predeterminable, constant clock raster.

The new amplitude values to be inserted, which replace at least parts of the edges of the original data bits, may advantageously form a sine oscillation which is optimal for a predetermined rise time and hence predetermined bandwidth limitation. To insert these new edges into the desired clock raster, the amplitudes are read in a predeterminable, constant clock raster, for example, from a memory and inserted into the data signal in such a way that they replace parts, particularly edges, of the original data signal. This results in a safe compliance with the bandwidth limitations as well as with a possibly predetermined clock raster.

In accordance with a further embodiment of the invention, the overall data signal is replaced by synthetically generated amplitude values.

Advantageously, the complete data signal, i.e., all bits of the data signal, can be replaced by synthetically generated amplitude values. It is thereby achieved that not only the edges but also the complete data signal inserted into the digital picture signal complies with the conditions relating to bandwidth limitations, but also with standard levels, etc.

As a result, the complete original data signal is replaced by a new signal which consists of the amplitude values which form the edges, and possibly also the other ranges of the signal to be inserted.

For a digital data encoder for encoding data of arbitrary data rates of at least one data signal for jointly transmitting the encoded data with a digital picture signal, the above-mentioned object is achieved, in accordance with the invention, in that a discrete time oscillator is provided, in dependence upon whose output signal synthetically generated amplitude values stored in a memory are accessed in such a way that at least parts of the edges of data bits of the data signal are replaced by synthetically generated amplitude values which constitute edges which are within bandwidth limitations predetermined for the encoded data bits.

The bits of the original data signal (or data signals) are at least partly replaced by amplitude values which are stored in a memory and have previously been generated synthetically. At least parts of the edges of the original data bits are replaced by the amplitude values. The new amplitude values form edges which are within the bandwidth limitations possibly predetermined for the inserted data bits, and comply with further prescriptions which may also be valid for the data signal after its conversion into analog values.

The amplitude values which are inserted into the digital data signal are read in dependence upon the output signal of a discrete time oscillator. With each system clock, such a discrete time oscillator adds the new increment data to the previously formed sum. Thus, with each system clock, the sum generated in the discrete time oscillator and being available as an output signal at the output is increased (or decreased) by the increment applied to the input. The change of the output values of the discrete time oscillator depends on the system clock and on the increment applied to its input. It thereby enables such a discrete time oscillator to make a signal available at the output, whose data values predetermine a clock which is not in an integral ratio with the system clock with which the discrete time oscillator is clocked. This property of the discrete time oscillator is particularly advantageous for the digital data encoder because in this way, the clock raster, with which the amplitude values are formed, is independent of the system clock, or need not be in an integral ratio with this clock.

By changing the increment which is applied to the input of the discrete time oscillator, this clock raster, which is comprised in the values of the output signal of the discrete time oscillator, can be adapted to individual requirements. For example, the increment can be changed for different bandwidth limitations of different data of different data signals so that the digital data encoder according to the invention is capable of supplying different data from different data signals with differently formed or differently steep edges as newly encoded data signals at the output.

Since, as explained above, the discrete time oscillator adds the increment applied thereto upon each system clock to the previously formed sum, its value is constantly increased, so that, dependent on the word length, there will be an overflow at a given moment. With small deviations determined by the overflow rest, this overflow marks those instants at which a rising or falling edge is introduced, within the desired clock raster, into the data signal by inserting the stored amplitude values. The magnitude of the increment value applied to the discrete time oscillator then determines the time gaps in which these overflows of the values of the discrete time oscillator occur. The magnitude of the increment value also influences the extent of changes of the output values of the discrete time oscillator with every system clock. Consequently, the increment value also determines which amplitude values are read from the memory, and thus the current point on the edges used in the data signal.

This provides an optimum adaptation to different requirements of the data signals which are present at different clock rasters, and to the bandwidth limitations predetermined for the encoded data signal. All of these requirements can be realized with a relatively simple digital data encoder which is suitable for all data formats. Even an adaptation of the data encoder to changed requirements or additional requirements is easily possible because only the increment values of the discrete time oscillator have to be adapted accordingly. Changes of circuits are not necessary for this purpose.

In accordance with a further embodiment of this data encoder according to the invention, the edges formed from the amplitude values are only used at instants predetermined by the discrete time oscillator, preferably when there is an overflow of the discrete time oscillator.

The output of the discrete time oscillator supplies an output signal changing with every system clock with which it is clocked, and representing a linearly rising (or falling) edge. Dependent on this edge, the amplitude values are read from a memory and used for forming the edges.

These edges may have to be generated in a predetermined clock raster. The overflow of the discrete time oscillator may be used for this purpose. This overflow occurs at predeterminable intervals in dependence upon the system clock and the increment values applied to the input of the discrete time oscillator. These values may be chosen to be such that the overflow is synchronized with the desired clock raster. By selecting these values, it can then be achieved that the newly generated edges are generated in the clock raster.

In accordance with a further embodiment of the encoder according to the invention, synthetically generated amplitude values, which constitute at least parts of a sine oscillation, are stored in the memory. The amplitude values stored in the memory may preferably form a sine oscillation which, instead of the original edges of the data bits, is supplied as an encoded data signal.

However, a further advantageous embodiment of the invention is characterized in that the overall data signal is replaced by synthetically generated amplitude values stored in the memory. It is thereby ensured that the data signal corresponds to the nominal values as regards all requirements, for example, also amplitude requirements.

In accordance with a further embodiment of the data encoder according to the invention, an address generator driven by the output signal of the discrete time oscillator is provided, in dependence upon whose output signal the amplitude values stored in the memory are addressed.

As described above, the values of the output signal of the discrete time oscillator represent a rising or falling edge. These values may be used for driving an address generator which, in its turn, drives the required amplitude values in a memory and initiates their read-out from the memory. In dependence upon the output signal of the discrete time oscillator, the amplitude values forming the new edge are read from the memory.

In accordance with a further embodiment of the invention, the division rest occurring after each overflow of the discrete time oscillator in the edge occurring in the data signal determines that amplitude value stored in the memory, starting with which value an edge occurring in the data signal may be formed from the synthetically generated amplitude values.

As already described hereinbefore, the discrete time oscillator is advantageously implemented in such a way that, in dependence upon the system clock and the increment applied to its input, its output signal changes continuously until there is an overflow which occurs at instants corresponding to a desired clock raster. However, after the overflow, a "rest" occurs in the discrete time oscillator, this rest having different values. This rest indicates the extent to which the overflow instant deviates from the desired clock raster. In this case, small deviations are concerned which can be additionally taken into account in the digital encoder by utilizing this division rest, occurring after an overflow in the discrete time oscillator output signal, for determining that part of the edge with which a start is made when generating the edge to be inserted. The fact is taken into account that the overflow has not occurred exactly in the clock raster but at a deviating instant whose value is indicated by the overflow value.

Thus, a new edge is not necessarily always formed with the first amplitude value which is normally provided for an edge. Alternatively, the edge may also be started with an earlier or later amplitude value. If the edge is started with a later amplitude value, the previous amplitude values are omitted. As a result, it is achieved that the 50% value of the edge always occurs at the predetermined clock instants.

In accordance with a further embodiment of the data encoder according to the invention, upon every occurrence of an overflow of the amplitude values, the discrete time oscillator supplies a request signal by means of which data are called forward from the data signal and hence from a data source.

As already explained hereinbefore, the discrete time oscillator or the increment signal applied thereto may be implemented in such a way that new edges are generated in dependence upon the data signal in accordance with a predetermined clock raster. In order that the data bits of the original data signal are available at these instants, the discrete time oscillator is advantageously implemented in such a way that it supplies a request signal at those instants at which its values overflow, with which request signals new data are called forward. Thus, new data, whose edges are formed, are available at the instants corresponding to the clock raster.

In accordance with a further embodiment of the invention, the value of the increment which is applied to the discrete time oscillator is variable for setting the steepness of the edges formed from the synthetically generated amplitude values.

An essential advantage of the data encoder according to the invention is that it can easily be adjusted to different data rates or predetermined bandwidth limitations of the encoded signal. This may be realized in a simple manner by changing the increment value which is applied to the discrete time oscillator. By changing the magnitude of the increment value, it can be determined with which clock raster the amplitude values are read from the memory. As a result, a change of the steepness of the edges formed is thereby realized.

In accordance with a further embodiment of the invention, the discrete time oscillator is reset at the start of each picture line of the digital picture signal.

To minimize possibly occurring slight deviations between the overflow instants of the discrete time oscillator and the predetermined clock raster, the discrete time oscillator is advantageously reset to an initial value at the start of each picture line of the digital picture signal. It is thereby achieved that a possibly slight discrepancy of this clock raster with the start of each picture line is reset and thus does not reach influential values.

In accordance with a further embodiment of the data encoder according to the invention, an edge and amplitude detector is provided, in dependence upon whose output signal the address generator accesses data bits of the data signal which are assigned to the signal variation of the amplitude values and which are stored in the memory.

As already explained hereinbefore, at least parts of the edges but, in the extreme case, also the complete data signal are replaced by a new signal which represents the encoded signal and is formed from amplitude values. To determine those amplitude values which are read from the memory in dependence upon the output signal of the discrete time oscillator, an edge and amplitude detector is advantageously provided, which detects whether there is a rising edge, a falling edge, a value "zero" or a value "one" in the original data signal to be encoded, which can be encoded and replaced by new amplitude values.

BRIEF DESCRIPTION OF THE DRAWING

With the above and additional objects and advantages in mind as will hereinafter occur, the invention will be described with reference to the drawing, in which:

The sole FIGURE shows a block diagram of a digital data encoder in accordance with the invention.

DESCRIPTION OF THE PREFERRED EMBODIMENTS

The sole FIGURE is a block diagram of a digital data encoder according to the invention, whose input receives data of possibly different data signals. These data are denoted by Data-IN in the FIGURE. These data of different data signals generally have different clock rates. Consequently, different bandwidth limitations are imposed on the data to be encoded.

To adapt the data encoder to such different requirements, a data-type register 1 is provided which adapts the data encoder to different data rates or different predetermined bandwidth limitations.

The input data "Data-IN" may be, for example, video text data (teletext data) of different data formats, Wide-Screen Signalling Data with which the aspect ratio of the picture signal is signalized, or Closed Captioning Data which resemble teletext data.

These externally supplied data are applied to a first input 2 of a first multiplexer 3 in the data encoder shown in the FIGURE.

A data memory 4, in which parts of these data having a known predetermined format such as, for example, the Wide Screen Signalling Data are stored, may be provided in this arrangement. In this case, the data are read from the data memory 4, triggered by the data-type register 1 and should not be supplied as external data.

In dependence upon the presence of externally supplied data or on the fact whether data from the data register 4 are to be encoded, the data-type register 1 drives the multiplexer 3 in such a way that it is either connected to its first input 2 conveying the external data, or to a second input 5 to which the data read from the data memory 4 are applied. The data to be encoded are then present at the output of the multiplexer 3.

These data are applied to a first input 6 of a second multiplexer 7. Furthermore, an encoder 8 is provided which also receives the output data of the first multiplexer 3 and possibly recodes the data For example, an original value "one" of the data signal can be converted into a low-high edge. In a corresponding manner, a data value "zero" is converted into a high-low edge. The output values of this encoder are applied to a second input 9 of the second multiplexer 7. The encoder 8 is optional and only required when such a recoding is desired. The second multiplexer 7 is also driven by the data-type register 1.

The second multiplexer 7 precedes an edge and amplitude detector 10 which detects whether the data signal applied thereto has the value "zero" corresponding to Low, the value "one" corresponding to High, or a positive or negative edge. The output signal which signalizes this is applied to a second input 12 of an address generator 13.

The data encoder shown in the FIGURE includes a discrete time oscillator 14. Such a discrete time oscillator adds an increment value applied to its input at every system clock to a previously formed sum. With every new system clock, the sum is increased by the increment value applied to the input. This process is repeated until a maximum value is reached and an overflow of the values occurs in the discrete time oscillator. At this overflow, a rest value remains in the discrete time oscillator, which value is also supplied as an output signal. The output values of the discrete time oscillator thus constitute output values changing by the increment with every system clock during counting, these output values continuously changing with every system clock until the overflow occurs. After the overflow, the addition of the increment values is continued with every system clock, starting with the overflow rest. As a result, the values of the output signal of the discrete time oscillator constitute a form of sawtooth signal which, upon each overflow, changes from the maximum value back to the overflow value proximate to a minimum and forms a rising edge between these values.

An increment value register 15 supplies an increment value to the input of the discrete time oscillator 14. At each system clock, which is not shown in the FIGURE, the discrete time oscillator 14 adds a further increment value to the previously formed sum.

The increment value which is supplied by the increment value register 15 is variable and is set by the data-type register 1. The increment value can then be adapted to he clock raster of the data signal to be encoded.

A first output 16 of the discrete time oscillator 14 supplies that output signal which forms a kind of sawtooth signal in the manner described above. This signal is applied to a first input 17 of the address generator 13.

The discrete time oscillator 14 supplies a signal from a second output 18 when there is an overflow. It is then signalized to external circuit arrangements (not shown) that a new data bit is to be supplied for encoding. This signal is denoted by Dat.-Req (Data Request) in the FIGURE. Furthermore, this signal is applied to the edge and amplitude detector 10 which, at the instants when this signal occurs, signalizes the form of the data signal to be encoded to the address generator 13.

The values of the output signal made available at the first output 16 of the discrete time oscillator 14 change in the manner described above between two overflows occurring in the discrete time oscillator 14, such that a rising (or falling) edge is formed. The amplitude values change with every system clock by the increment value supplied by the increment value register 15. This output signal is converted into addresses by the address generator 13, these addresses being applied to a memory 20. Amplitude values, which form at least parts of signal edges are stored in the memory 20. Preferably, these are amplitude values which form at least parts of a sine oscillation. The edge and amplitude detector 10 signalizes whether it is a rising or a falling edge. The data encoder may also be implemented in such a way that the complete data signal to be encoded and applied to the input is replaced by new amplitude values. In this case, Low values or High values are also replaced by new amplitude values from the memory 20.

The memory 20 precedes an amplifier 19 which has a variable gain factor which may be adapted to different level requirements of the data signal to be encoded. The variable gain is adjusted by the data-type register 1 in dependence upon the type of data signal.

The output of the amplifier 19 supplies the encoded data signal which is denoted by Data-OUT in the FIGURE. This signal represents a data signal which was formed in dependence upon the data signal applied to the input or the data signal read from the data memory 4 but which actually consists of amplitude values which were read from the memory 20. This data signal can then be formed in the desired manner.

Dependent on the type of data which are applied to the input data as Data-IN or are read from the data register 4, the data register is set accordingly. This, in turn, signalizes the data type to the increment register 15 which sets a corresponding increment value which is assigned to the data type or the data clock raster. The discrete time oscillator 14 operates with this increment value. Dependent on the magnitude of the increment value, the output values of the discrete time oscillator also change stepwise in accordance with the increment value. Dependent on this signal, the new amplitude values are read from the memory 20 by means of the address generator 13. The rate at which, for example, an edge of a sine signal stored in the memory 20 is read, can then be adjusted by means of the increment value. As a result, it is achieved that this edge is formed from amplitude values which are read more or less rapidly. It is achieved by this slower or more rapid read-out that the edge is generated in a flatter or steeper form.

The magnitude of the increment value also determines at which instants there is an overflow of the values of the discrete time oscillator. Since these overflow instants indicate those instants at which edges are inserted into the data signal from the amplitude values which are read from the memory, the increment value also determines the clock raster of the encoded data signal, i.e., the time intervals in which the edges occur in the encoded data signal.

The data encoder can be adapted to different data rates merely by changing the increment values which are applied to the discrete time oscillator 14. Moreover, the steepness of the generated edges may be changed by adapting the increment values.

An adaptation to different data signals is possible by simply switching the data register 1. Moreover, an adaptation to new data formats is also possible because only the data stored in the data register 1 and the increment register 15 are to be adapted for this purpose. This allows an extremely flexible use of the data encoder.

What is claimed is:

1. A method of encoding digital data of arbitrary data rates of at least one digital data signal for jointly transmitting the encoded data with a digital picture signal, characterized in that, in the encoding of the data, said method comprises the step:

replacing at least parts of the edges of data bits of the digital data signal with synthetically generated amplitude values constituting edges which are within bandwidth limitations predetermined for the encoded data bits.

2. A method of encoding digital data of arbitrary data rates of at least one data signal for jointly transmitting the encoded data with a digital picture signal, said method comprises the step:

replacing at least parts of the edges of data bits of the data signal with synthetically generated amplitude values constituting edges which are within bandwidth limitations predetermined for the encoded data bits;

wherein said replacing step comprises:

replacing the edges of the data bits with amplitude values which constitute at least parts of a sine oscillation; and inserting the edges built up from the amplitude values into a predeterminable, constant clock raster.

3. A method of encoding digital data of arbitrary data rates of at least one data signal for jointly transmitting the encoded data with a digital picture signal, said method comprises the step:

replacing at least parts of the edges of data bits of the data signal with synthetically generated amplitude values constituting edges which are within bandwidth limitations predetermined for the encoded data bits;

wherein the overall data signal is replaced by synthetically generated amplitude values.

4. A digital data encoder for encoding data of arbitrary rates of at least one data signal for jointly transmitting the encoded data with a digital picture signal, characterized in that the digital data encoder comprises:

an input for receiving said at least one data signal;

means for detecting at least parts of edges of data bits of said at least one data signal;

a memory having synthetically generated amplitude values stored therein; and a discrete time oscillator coupled to said detecting means for generating an output signal, said output signal being applied to said memory such that said detected at least parts of the edges of data bits of the data signal are replaced by synthetically generated amplitude values which constitute edges which are within bandwidth limitations predetermined for the encoded data bits.

5. A digital data encoder as claimed in claim 4, characterized in that the edges formed from the amplitude values stored in the memory are only used at instants predetermined by the discrete time oscillator, said predetermined instants being when there is an overflow of the discrete time oscillator.

6. A digital data encoder as claimed in claim 4, characterized in that said synthetically generated amplitude values stored in the memory constitute at least parts of a sine oscillation.

7. A digital data encoder as claimed in claim 4, characterized in that the overall data signal is replaced by synthetically generated amplitude values stored in the memory.

8. A digital data encoder as claimed in claim 4, characterized in that said digital data encoder further comprises an address generator driven by the output signal of the discrete time oscillator, an output signal of the address generator being used to address the amplitude values stored in the memory.

9. A digital data encoder as claimed in claim 4, characterized in that a division rest occurring after each overflow of the discrete time oscillator in the edge occurring in the data signal determines a starting amplitude value, from the amplitude values stored in the memory, for forming an edge from the synthetically generated amplitude values.

10. A digital data encoder as claimed in claim 4, characterized in that, upon every occurrence of an overflow of the discrete time oscillator, the discrete time oscillator supplies a request signal for requesting further data from a data source.

11. A digital data encoder as claimed in claim 4, characterized in that a value of increment of the discrete time oscillator is variable for setting the steepness of the edges formed from the synthetically generated amplitude values.

12. A digital data encoder as claimed in claim 4, characterized in that the discrete time oscillator is reset at the start of each picture line of the digital picture signal.

13. A digital data encoder as claimed in claim 8, characterized in that said detecting means comprises an edge and amplitude detector, an output signal of the edge and amplitude detector being applied the address generator causing the address generator to access the amplitude values stored in the memory.

14. A digital data signal generated by the data encoder as claimed in claim 4.

15. A digital data signal as claimed in claim 14, characterized in that the data signal is comprised in a digital picture signal.

16. A video encoder for converting a digital picture signal into an analog picture signal, characterized in that the video encoder comprises a data encoder as claimed in claim 4.

* * * * *